J. LA PLANT.
RESILIENT WHEEL TIRE.
APPLICATION FILED JAN. 12, 1915.

1,173,814.

Patented Feb. 29, 1916.
2 SHEETS—SHEET 1.

Inventor
Jed La Plant,

Witnesses

By Victor J. Evans
Attorney

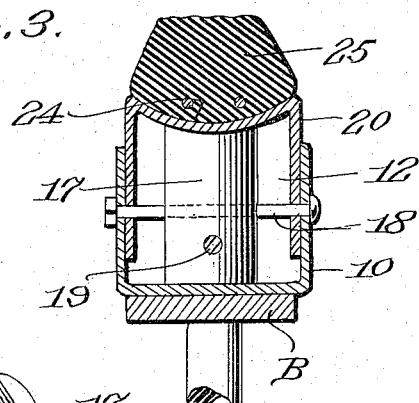
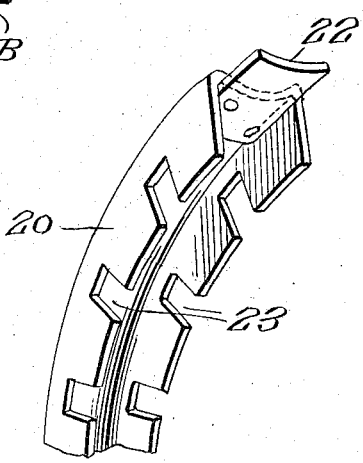
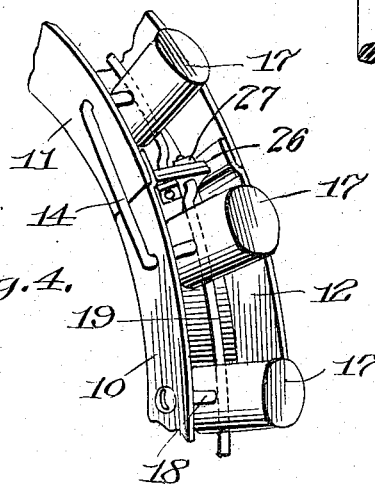
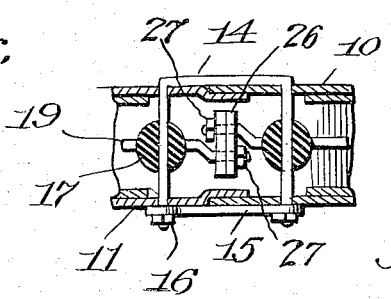

UNITED STATES PATENT OFFICE.

JED LA PLANT, OF MALONE, NEW YORK.

RESILIENT WHEEL-TIRE.

1,173,814.  Specification of Letters Patent.  Patented Feb. 29, 1916.

Application filed January 12, 1915. Serial No. 1,842.

*To all whom it may concern:*

Be it known that I, JED LA PLANT, a citizen of the United States, residing at Malone, in the county of Franklin and State of New York, have invented new and useful Improvements in Resilient Wheel-Tires, of which the following is a specification.

The invention relates to vehicle wheels, and more particularly to the class of resilient wheel tires.

The primary object of the invention is the provision of a tire wherein the tread thereof is resilient to absorb shocks and jars incident to the travel of the wheel, and also to yield in accordance with irregularity of the surface over which the same may travel, the tire being of novel form to assure durability and to render it puncture-proof, thus avoiding blow-outs, and the usual splitting thereof during the life of the same.

Another object of the invention is the provision of a tire structure wherein the same can be readily and conveniently mounted upon a wheel against lateral displacement, yet is free to yield during the travel of the wheel.

A still further object of the invention is the provision of a tire structure of this character which is extremely simple in construction, thoroughly reliable and efficient in its purpose, strong, durable, and inexpensive in manufacture.

With these and other objects in view, the invention consists in the construction, combination and arrangement of parts as will be hereinafter fully described, illustrated in the accompanying drawings, and pointed out in the claim hereunto appended.

Figure 1:
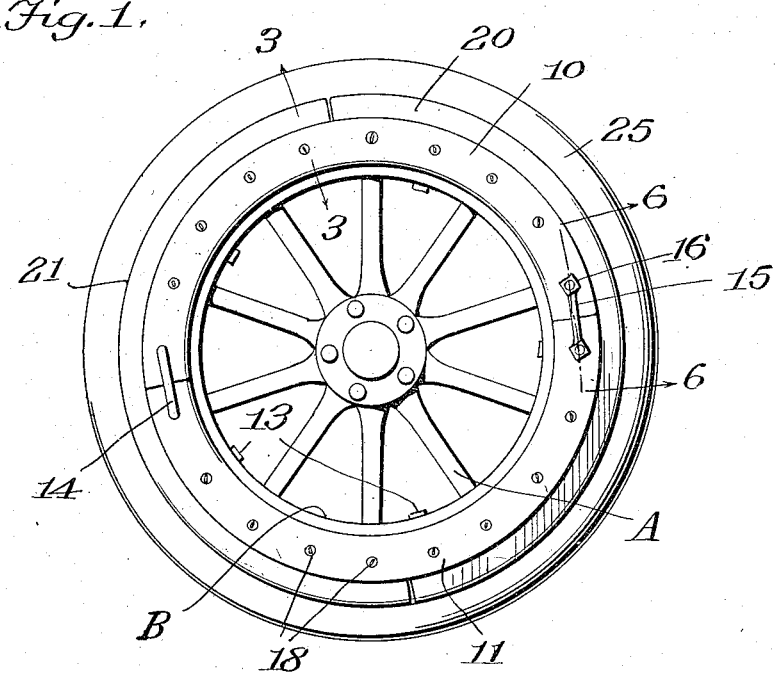
Figure 2:
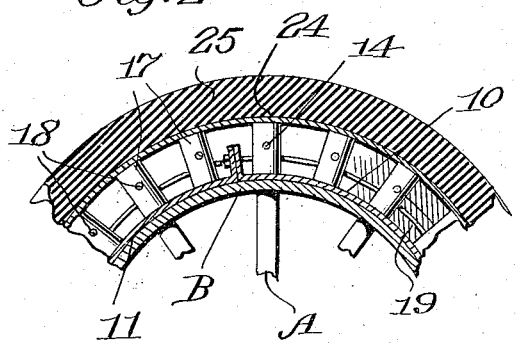

In the drawings:—Figure 1 is a side elevation of a wheel showing the tire structure constructed in accordance with the invention thereon. Fig. 2 is a fragmentary vertical sectional view through the same. Fig. 3 is a sectional view on the line 3—3 of Fig. 1. Fig. 4 is a perspective view showing the tread and outer annulus removed. Fig. 5 is a fragmentary perspective view of the outer annulus. Fig. 6 is a sectional view on the line 6—6 of Fig. 1.

Similar reference characters indicate corresponding parts throughout the several views in the drawings.

Referring to the drawings in detail, A designates generally a spoked wheel, having the felly B as usual, the same being of any ordinary well-known construction with the outer periphery thereof flat for the mounting of the tire hereinafter fully described.

The tire comprises an inner annulus formed in two sections 10 and 11, which are identical to each other and form a channel 12, the two sections being disposed concentrically about the felly B, and are connected thereto through the medium of bolt fasteners 13, while their ends adjacent to each other are connected together through the medium of staples 14 which are passed transversely through the side flanges of the sections and engage in a bridge piece 15 at the open end of each staple, the ends of the said staples being fitted with adjustable nuts 16 which work against the bridge piece 15 disposed without the inner annulus.

Arranged within the channel 12 formed by the inner annulus are spaced radial resilient studs 17 through which with the exception of the two arranged at the ends of the annulus is passed a bolt 18. The two studs at the end of the annulus are secured by means of the parallel limbs of a U-shaped staple 14 that passes through the studs and also the side flanges of the inner annulus, while disposed concentrically within the said channel 12 is a circular rod 19 which passes through the studs 17, and in this manner the same are held against displacement within the channel. Telescoped within the channel 12 in the inner annulus is an outer annulus formed in two sections 20 and 21, both being identical to each other and have their ends adjacent one another connected together through the medium of coupling plates 22, the side flanges of the outer annulus being formed with radial slots 23 opening through the inner peripheral edges thereof to accommodate the transverse bolts 18 mounted in the inner annulus, so that in this manner the outer annulus will be supported upon the studs 17, while formed in the sections of the said outer annulus is an annular outer peripheral tire seat 24 in which is fitted a solid rubber tire 25 which is of any approved construction, and may be cemented or otherwise fixed in the seat 24 in the said outer annulus to serve as a resilient tread for the wheel.

On the meeting ends of the inner annular sections are abutment brackets 26 through which pass the ends of the rods 19, and these ends carry nuts 27 which are threaded thereon.

From the foregoing description, taken in connection with the accompanying drawings, it is thought that the construction of the device will be clearly understood, and therefore a more extended explanation has been omitted.

What is claimed is:—

A resilient tire for vehicle wheels comprising a sectional externally channeled inner annulus adapted to be fixed to the felly of a wheel, an internally channeled outer annulus fitted within the said inner annulus and having an external peripheral seat, a resilient tire in said seat, a plurality of resilient blocks arranged at intervals between the inner and outer annuli and concealed within the channels therein, cross pins passed through the sides of the inner annulus and also passed transversely through the blocks, a wire concentrically disposed about the inner annulus and passed through the blocks, and means on the inner annulus for fastening the ends of the wire.

In testimony whereof I affix my signature in presence of two witnesses.

JED LA PLANT.

Witnesses:
JAMES E. PRICE,
ERNEST S. MASON.

Copies of this patent may be obtained for five cents each, by addressing the "Commissioner of Patents, Washington, D. C."